Patented May 2, 1950

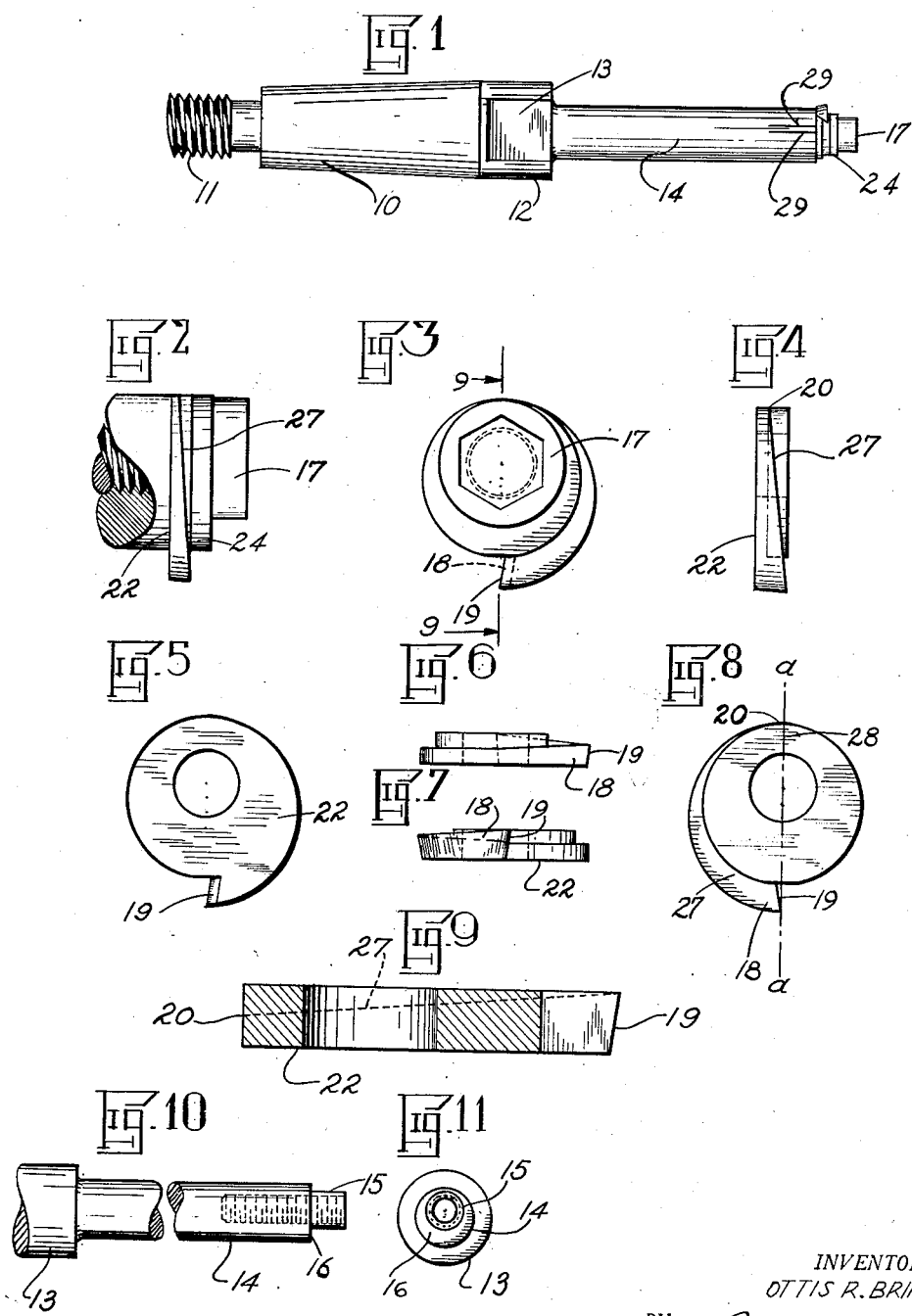

2,506,338

UNITED STATES PATENT OFFICE 2,506,338

BORING TOOL

Ottis R. Briney, Jr., Pontiac, Mich., assignor of one-half to James W. Briney

Application October 28, 1948, Serial No. 56,967

1 Claim. (Cl. 77—58)

This invention relates broadly to boring tools and more specifically to improvements in boring bars and cutters therefor.

One of the objects of the invention resides in the provision of a cutting tool which is designed to accommodate the ready production thereof from an alloy of tungsten, carbon, and cobalt such as Carboloy, and also accommodate the redressing and adjustment of the cutter without removal thereof from its holder.

Other objects of the invention contemplate the provision of a tool which is economic of production, efficient of operation, durable of structure, and designed to facilitate high production, superior finish, and maximum precision.

Referring to the drawings:

Fig. 1 is a side elevational view of the improved boring bar with the cutter mounted thereon in its operative position;

Fig. 2 is a side elevational view of a fragmentary portion of a boring bar and cutter assembly;

Fig. 3 is an end elevational view thereof;

Fig. 4 is a side elevational view of the cutter;

Fig. 5 is a plan view of the rearward face of the cutter;

Fig. 6 is a side elevation of the cutter as viewed from the face opposite the cutting edge thereof;

Fig. 7 is a similar elevation of the cutter as viewed from the cutting edge thereof;

Fig. 8 is a top plan view of the cutter;

Fig. 9 is a vertical sectional view of the improved cutter shown upon an enlarged scale, the section being taken on a plane indicated by the line 9—9 in Fig. 3;

Fig. 10 is a detail elevational view of the improved boring bar; and

Fig. 11 is an end elevational view thereof.

Referring first to Fig. 1, the improved boring bar is preferably formed with a tapered shank 10 having a threaded end portion 11 thereon to facilitate the rigid securement of the bar within the machine tool spindle upon which it is to be used. The holder further embodies a central cylindrical portion 12, preferably formed with opposed flat areas 13 thereon to accommodate the use of a wrench in drawing the tapered shank into seated engagement with the recess in the machine tool spindle, and further embodies a bar portion 14 formed with a diametrically reduced end portion 15 constituting a pintle disposed in eccentric relation with the medial axis of the bar and defining a shoulder 16 to delimit the inward movement of the cutter when mounted in assembled relation thereon. The pintle 15 is machined with an axial threaded opening therein for the reception of a cap screw 17 to facilitate the securement of the cutter in clamped relation against the shoulder 16 in the end of the boring bar.

As will be seen in Figs. 5 and 8, the cutter is formed with an opening in the body thereof which is disposed in eccentric relation with the center of the major portion thereof, and is further formed with a spiral section 21 in the perimeter of the cutter which emanates from a point on the annular body of the cutter and terminates in a shoulder 18 in diametric opposition thereto. The shoulder 18 is disposed in angular relation to the center line $a$—$a$ as shown in Fig. 8 to form a clearance for the chip shavings, and tapers rearwardly from the forward face 19 of the cutter to a point 20 adjacent the center of the edge of the cutter and in proximity with the point at which the spiral merges with the arcuate perimeter thereof to form the rake in the cutter. The shoulder 18 is further biased inwardly from its forward face 19 to the rearward face 22 thereof to form a cutting edge clearance for the tool.

In the operation of Carboloy tools it has been found that it is essential to support the cutter in rigid securement with the boring bar or holder in order to avoid the deleterious effects of vibration and consequent disintegration of such material. Hence in forming the boring bar the improved holder is formed with the screw 11 in the end thereof and a tapered shank to assure the rigid affixation of the bar in the spindle of the machine. Since the pintle 15 is disposed in eccentric relation with the boring bar 14 and since the cutter is mounted for eccentric movement thereon it will be recognized that the throw or angular position of the cutter relative to the medial axis of the bar 14 may be attained by merely loosening the screw 17, then rotating the cutter or rotating the holder and cutter simultaneously. The cutter may be sharpened by merely dressing the face 19 thereof parallel with the angle initially provided in the tool, then loosening the screw, readjusting the cutter, then tightening the screw against a washer 24 until the flat rearward face 22 of the cutter is engaged with the shoulder 16 adjacent the end of the boring bar 14.

From the foregoing it will be recognized that the spiral outer face of the tool will provide the requisite cutting clearance, that the rearwardly inclined forward face of the spiral section will form the rake of the cutter, and that the eccentric relation of the cutter and pintle will accommodate repeated sharpening operations of the cutter without removal thereof from the boring bar.

If desired, the cutter may be formed with a scribed line 28 on the face thereof and two or more lineal marks 29 on the boring bar, which are calibrated to guide the operator in making radial adjustment of the cutter.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

A boring tool comprising a bar, an eccentric pintle on the free end thereof having an axial threaded recess therein, a cast circular cutting tool having an eccentric opening therein mounted on said pintle, a screw for the retention thereof, parallel faces on the opposed sides of said cutter, a spiral portion in one half the perimeter of said cutter emanating from a point on the circumference of the cutter and terminating in diametric opposition thereto, a shoulder in the perimeter of the cutter at the point of termination of said spiral portion, the face of one side of said spiral portion being inclined throughout the length of the spiral portion from the leading edge of said shoulder to a point intermediate the thickness of the cutter, the top edge of said shoulder being inclined from the outer to the inner corner thereof and the top edge of the shoulder being inclined toward the rearward face of the cutter.

OTTIS R. BRINEY, Jr.

REFERENCES CITED

The following references are of record in the file of this patent:

UNITED STATES PATENTS

| Number | Name | Date |
|---|---|---|
| 1,052,400 | Baker | Feb. 4, 1913 |
| 1,887,372 | Emmons | Nov. 8, 1932 |

FOREIGN PATENTS

| Number | Country | Date |
|---|---|---|
| 256,153 | Great Britain | Aug. 5, 1926 |
| 667,868 | Germany | Nov. 22, 1938 |